United States Patent Office 3,247,106
Patented Apr. 19, 1966

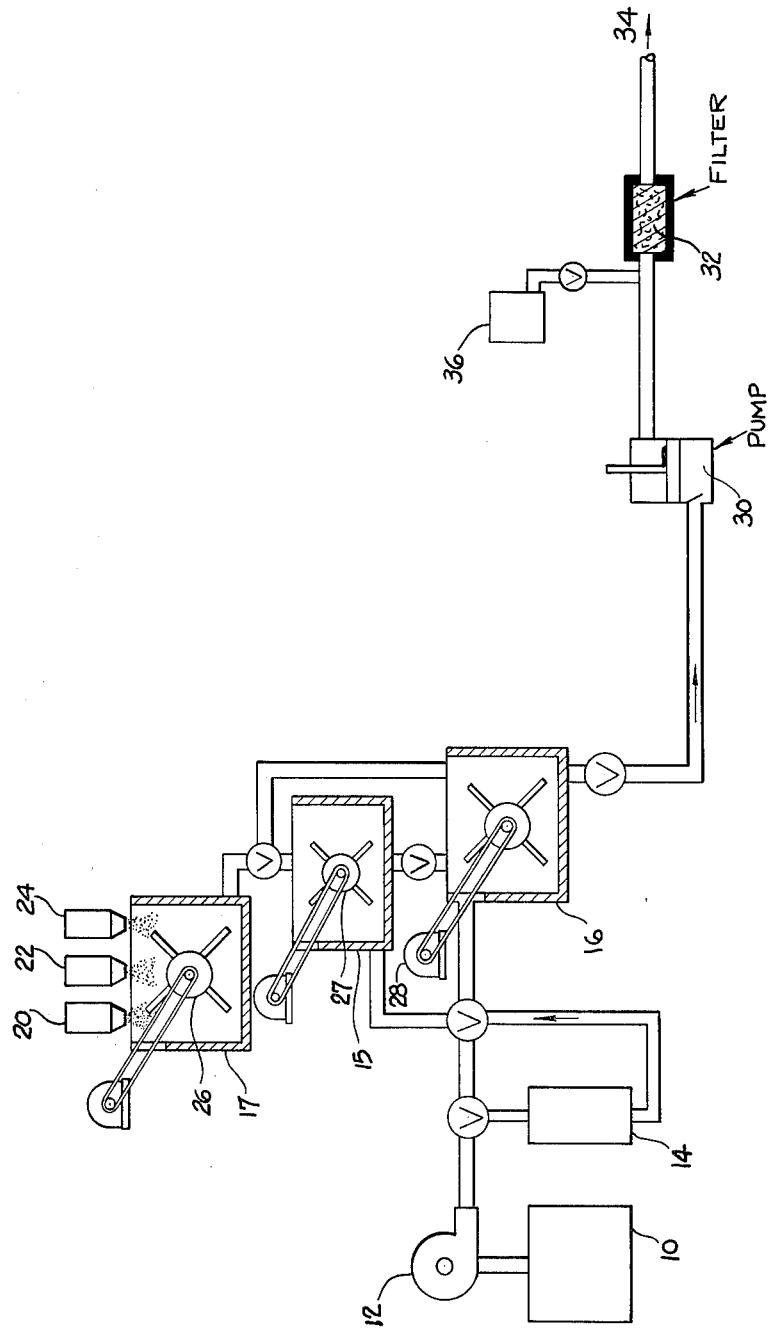

---

3,247,106
PRECONDITIONING PROCESS FOR THE REMOVAL OF IMPURITIES FROM WATER
John Sopoci, Neshanic Station, N.J., assignor to Johns-Manville Corporation, New York, N.Y., a corporation of New York
Filed Nov. 12, 1963, Ser. No. 322,589
11 Claims. (Cl. 210—52)

This invention relates to an improved method for removing collodial and/or finely divided insoluble materials from liquids, and particularly concerns the removal of color matter and turbidity from water supplies and waste water streams. More specifically, this invention relates to an improvement in filter aid filtration including a preconditioning step to convert contaminants to a clarifiable condition and to attach them to rigid filter aid particles to render them filterable.

Turbidity and color of the many impurities found in water supplies are among the most troublesome. Turbidity is defined as the lack of clearness in water and is primarily due to finely divided suspended matter such as silt, organic particles, microscopic organisms, and similar materials. It should not be confused with color, as water may be dark in color but, nevertheless, clear and not turbid. Turbidity is measured as the diffraction of light passing through the water caused by the suspended particles, rather than in terms of weight concentration.

Color of water, on the other hand, is exactly what the word means, the light characteristics of water as determined by visual observation, and generally, is imparted to water by the presence of complex organic bodies either collodial or in true solution. Color in water supplies is objectionable from two basic standpoints; one of a real nature and the other of an aesthetic nature. Specifically, the real effect of color content is primarily its interference with industrial processes; for example, to the extent of discoloration of fabrics and food products. On the other hand, drinking or other home uses of colored water have distinct psychological effects and therefore presents certain disadvantages.

A detailed explanation of the many attempts to date to overcome these difficulties is set out in copending U.S. Letters Patent application Serial No. 267,670, filed March 25, 1963, and assigned to the instant assignee. Moreover, there is disclosed therein a new method to improve the removal of color and turbidity in conjunction with filter aid filtration techniques.

Specifically, it has been determined that substantial and economical turbidity and color removal may be effected by employing preconditioning techniques in conjunction with filter aid filtration, as opposed to heretofore used pretreatment. This process involves the steps of uniformly dispersing a cationic polyelectrolyte in the color and turbidity laden water, introducing floc former and filter aid into the water, and thereafter precipitating the floc former as a coating on the filter aid. The water is filtered through any filter aid filter to effect substantially complete removal of the aforementioned impurities. It is important to note the water is directly passed to the filter without necessitating the use of any detention or settling steps, such as those associated with pretreatment and sand filters. The amount of turbidity and color in the filtered water may be reduced to 5 A.P.H.A. silica units and 15 p.p.m. on the platinum-cobalt scale, respectively, which equals or betters the currently recommended standards of the U.S. Public Health Service. Serial No. 267,670 is included herein by reference.

The new preconditioning technique, while more practical and economical than heretofore practiced pretreatment sand filtration techniques, has certain disadvantages. For example, the preconditioning technique has limitations as to the filtration cycle length and it is desirable to increase the length of the cycle and prolong the use of the filter and thereby provide more economical filtration cycles. Similarly, while the preconditioned filtered water satisfies the present U.S. Public Health Service standards, technological advances and certain highly sensitive industries require, and will continue to require, higher standards of clarity and purity. Consequently, it is desirable to effect improvements in filter aid water filtration not only to provide more economical filtration, but to permit better color and turbidity removal.

It is therefore a principal object of this invention to improve the above-mentioned preconditioning filter aid filtration process.

It is a further object of this invention to provide a method for clarifying and purifying water supplies, with particular emphasis on effective removal of turbidity, color, and other impurities.

It is another object of this invention to provide a new and more practical method of introducing preconditioning ingredients into waste water or water supplies to increase the effectiveness of the additives, and particularly as to the removal of turbidity and color.

Another object of this invention is to provide more economical and effective means of purifying contaminated water sources to render them potable and useful for highly sensitive industries.

Additional objects and further scope of applicability of the present invention will become apparent in the detailed description given hereinafter, the preferred embodiment of which has been illustrated in the accompanying drawing by way of example only wherein:

FIGURE 1 is a schematic view of the chemical conditioning, water, preconditioning, and filtration equipment train useful in carrying out the instant invention.

It has now been determined the the foregoing objects may be satisfied and the above-mentioned filter aid preconditioning process improved by a novel technique involving the step of concentrated chemical conditioning prior to preconditioning the water to be filtered in a filter aid filtration process.

The resultant solids are more easily filtered and the finished effluent has a highly acceptable quality with respect to color and turbidity. To accomplish this, the filter aid is mixed with a floc former and polyelectrolyte in a concentrated slurry in the range of 1000 to 250,000 p.p.m. (parts per million). A detention time of approximately 5–15 minutes is employed prior to combining the activated concentrate with the filter feed to insure uniform distribution of the materials. Thereafter the filter feed is subjected to the preconditioning technique approximating that outlined above.

That is, the concentrated slurry is metered into the contaminated water and subjected to agitation to insure complete distribution of the polyelectrolyte, floc former, and filter aid in a given volume of water. Upon insuring the complete distribution of the ingredients, the agitation is lessened to permit the formation of a coating of the floc on the filter aid. This coating contains turbidity and color as inclusions therein in addition to the flocculant. The formation of the coating is controlled so that all or essentially all the floc formed is precipitated as the coating. It is understood, however, there may be a nominal amount of floc formed which is not precipitated as the coating. The resultant coated filter aid is then removed by standard filter aid filter technique.

With further reference to the accompanying drawing, this invention may be utilized in the following manner. Water, from a source such as a river, lake, pond, or well 10, is drawn from by a centrifugal pump 12 and passes to an aerating tower 14, or, alternatively, directly into an intermediate tank 15 or a preconditioning tank 16. If the water is first passed to the aerating tower it is then directly discharged into the preconditioning tank or intermediate flashing tank 15. Adjacent the preconditioning tank is a concentrating tank 17. Three feeding devices, 20, 22, and 24, are mounted above the tank 17 and permit the feeding of the polyelectrolyte, floc former, and filter aid, respectively. Upon uniformly dispersing the polyelectrolyte, the floc former and filter aid are introduced into the tank, pin point flocs formed, and precipitated as a coating upon the filter aid. The contents are preferably retained under just sufficient agitation for between 5-15 minutes as by agitator 22, to keep all solids suspended. After the coating is achieved, the concentrated slurry is introduced into the intermediate tank 15 in the proper dosage of between 1000 and 250,000 p.p.m. mixture along with water. The mixture is agitated as by means 27 for about 5 to 15 minutes. Thereafter the contents are passed to the preconditioning tank 16, and introduced into the water to be treated so as to provide a concentration of between 10 and 2000 p.p.m. The mixture is detained for 5-15 minutes under mild agitation as by means 28. The preconditioned water is then pumped by pump 30 to a commercial filter unit 32, with sufficient pressure to overcome both the resistance of the filter itself and the gradually increasing resistance of the accumulating filter cake. From the filter the water is pumped to end use 34. The filter is also provided with a precoat supply 36, to feed precoat filter aid to the filter.

The floc-former may be selected from soluble inorganic hydroxides or salts of trivalent or tetravalent metal such as chromium, thorium, iron, or aluminum with the latter two being preferred. The hydroxyl compounds are preferred. As with all the ingredients, the amount to be used is dependent on the character of the water being treated and the impurities to be removed. However, between 45 and 125,000 p.p.m. floc-former will generally be adequate for the concentrate, with between 90 and 62,500 p.p.m. being preferred.

The cationic polyelectrolyte as employed herein is defined as an organic substance having reoccurring ionizable groups wherein the cations are chemically linked and the anions are freely mobile. The group includes, among others, the substituted ammonium salts, i.e., including one or more of the characteristic groups primary, secondary (including imines) and tertiary amines, quaternary ammonium, and sulfonium salts, and may be presented by those set forth in U.S. Letters Patent Nos. 2,831,841, 2,909,508, and 2,995,512. One material found particularly useful is a hydrophilic alkylene polyamine polyfunctional halohydrin polymer resulting from the condensation of an alkylene polyamine and a polyfunctional halohydrin as aqueous solutions to a thickened condition short of gel formation and sold under the trademark Nalco 600. Another is a branch chain polyelectrolyte containing sulfonium active groups and sold under the trademark Ucar C-149. U.S. Letters Patent Nos. 2,469,683 and 2,543,666 also disclose operable cationic polyelectrolytes and their disclosures are incorporated herein by reference. Other branch chain cationic polyelectrolytes are known in the art. For the concentrated mixture, between 0.001 and 3200 p.p.m. polyelectrolyte will be sufficient for most water treatment with between 0.1 and 2000 p.p.m. being preferred.

The filter aid used in the body feed may be any one of the commercially available filter aids such as the diatomaceous silica, expanded perlite, fibrous filter aid, or mixtures of the same. The amount of filter aid used in the concentrate is varied between 500 and 125,000 p.p.m. with between 1000 and 62,500 p.p.m. being preferred.

The ratio of the ingredients in the concentrated slurry may vary; the filter aid to floc former ratio may range between 1:1 and 20:1, and the ratio of floc former to polyelectrolyte, may vary between 1:1 and 100:1. As stated above, the ingredients are combined in the concentration step to provide a concentrated slurry in the range of 100 to 25,000 p.p.m. When passed to the preconditioning tank, the concentration is reduced to between 10 and 2000 p.p.m. of ingredients, or 10-400 p.p.m. floc former, 10-400 p.p.m. filter aid, and 0.001-10 p.p.m. polyelectrolyte to act on the turbidity and color.

A more complete understanding of the invention will become apparent from the following examples of the operations within the scope of the invention.

*Example I*

A water supply having about 60 color units was pumped without aeration directly to the preconditioning tank. To the water was added 20 p.p.m. alum, 85 p.p.m. diatomaceous silica filter aid, and 1 p.p.m. of Nalco 600 cationic polyelectrolyte. The volume was then agitated at 20 r.p.m. for a 10 minute detention period. The whole preconditioned volume was then pumped to a filter which had been previously precoated with diatomaceous silica. The effluent had a color level of 10 to 15 units. The system yielded a head loss increase of 12.95 inches of water. This represented the precoating technique of Serial No. 267,670.

*Example II*

Constituents were added at the rate of 2000 p.p.m. alum, 8500 p.p.m. diatomaceous silica filter aid, and 100 p.p.m. of Nalco 600 cationic polyelectrolyte to a concentration tank with a 6 minute detention time. The same water supply as used in Example I containing approximately 60 color units was pumped without aeration to a flash mixing tank, intermediate the concentration tank and preconditioning tank. The concentrated slurry was metered to provide 20 p.p.m. alum, 85 p.p.m. filter aid, and 1 p.p.m. resin to the flash mixing tank agitated at 70 r.p.m. with a 2 minute detention time.

The volume was then transferred to and agitated in the preconditioning tank at 20 r.p.m. with a 6 minute detention time and finally pumped to a precoated filter. A standard increment of treated water yielded a head loss increase of 9.40 inches of water. The effluent yielded a color level of 5 units.

A comparison of Examples I and II conclusively showed a more economical filtration cycle with greater color removal using the instant invention.

*Example III*

A water supply containing approximately 60 color units was pumped without aeration to a flash mixing tank. Constituents were added to the flash mixing tank simultaneously and directly at a rate of 20 p.p.m. alum, 60 p.p.m. filter aid, and 2 p.p.m. of a branch chain polyelectrolyte containing sulfonium active groups. The volume was then put under high agitation for approximately ½ to 2 minutes until floc could be visually observed. The volume was transferred to the preconditioning tank and agitated at 15 r.p.m. with a 10 minute detention time. The whole preconditioned volume was pumped to a precoat filter.

A standard increment of treated water yielded a head loss increase of 7.00 inches of water. The effluent yielded a color level of 10 units.

*Example IV*

Constituents were added at the rate of 2000 p.p.m. alum, 6000 p.p.m. diatomaceous silica, and 200 p.p.m. of a branch chain polyelectrolyte containing sulfonium active groups, to the concentration tank with a 6 minute detention time. The same water supply as treated in Example III containing approximately 60 color units was pumped without aeration to a flash mixing tank. The concentrate was metered to provide 20 p.p.m. alum, 60 p.p.m. filter aid, and 2 p.p.m. polyelectrolyte to the flash mixing tank, and agitated at 70 r.p.m. with a 2 minute detention time. The volume was transferred to and agitated in the preconditioning tank at 20 r.p.m. with a 6 minute detention time and finally pumped to a precoated filter. A standard increment of treated water yielded a head loss increase of 5.80. The effluent yielded a color level of 5 units.

A comparison of Examples III and IV again indicated the significant increase in filtration cycle and color removal achieved by the instant invention as opposed to the prior technique.

*Example V*

Constituents were added at the rate of 2000 p.p.m. alum, 8500 p.p.m. diatomaceous silica filter aid, and 100 p.p.m. of a branch chain polyelectrolyte containing sulfonium active groups to the concentration tank with a 6 minute detention time. Water containing approximately 60 color units was pumped without aeration to a flash mixing tank. The concentrate was metered at the rate of 20 p.p.m. alum, 85 p.p.m. filter aid, and 1 p.p.m. polyelectrolyte to the flash mixing tank and agitated at 70 r.p.m. with a 2 minute detention time. The volume was transferred to and agitated in the preconditioning tank at 20 r.p.m. with a 6 minute detention time and pumped to a precoated filter. A standard increment of treated water yielded a head loss increase of 5.85 inches of water. The effluent yielded a color of 5 units.

Although one-half the amount of polyelectrolyte of Example IV was used, this example clearly indicated the superiority of the instant invention when compared with the preconditioning technique of Example III.

*Example VI*

Water containing approximately 60 color units was pumped into a flash mixing tank. Constituents were added at a rate of 2000 p.p.m. ferric sulfate, 8500 p.p.m. expanded perlite, and 100 p.p.m. polyelectrolyte into the high concentration tank with a detention time of 6 minutes.

The concentrate was then metered to the flash mixing tank to provide 20 p.p.m. alum, 85 p.p.m. perlite, and 1 p.p.m. polyelectrolyte agitated at 70 r.p.m. with 2 minutes detention time, and then transferred to the preconditioning tank with agitation at 70 r.p.m. at 6 minutes. The volume was pumped to a filter which has been previously precoated with expanded perlite. A standard increment of treated water yielded a head loss increase of 11.45 inches of water. Effluent yielded a color level of 10 units.

*Example VII*

A water supply containing approximately 100 color units was pumped to a flash mixing tank. Constituents are added at a rate of 2000 p.p.m. alum, 15,000 p.p.m. perlite, and 100 p.p.m. Ucar C–149 polyelectrolyte into the concentration tank with a detention time of 6 minutes. The concentrate was metered to the flash mixing tank to provide 20 p.p.m. alum, 150 p.p.m. perlite, and 1 p.p.m. polyelectrolyte and agitated at 70 r.p.m. with a 2 minute detention time. The volume was transferred to the preconditioning tank, agitated at 20 r.p.m. with 6 minutes detention, and pumped to a filter which has been previously precoated. A standard increment of treated water yielded a head loss increase of 12 inches of water. The effluent yielded a color level of 10 units.

*Example VIII*

The same water supply as Example VII was pumped into a flash mixing tank. Constituents are added at a rate of 2000 p.p.m. alum, 10,000 p.p.m. of an asbestos fiber-diatomaceous silica filter aid, and 100 p.p.m. Ucar C–149 polyelectrolyte into the concentration tank with a detention time of 6 minutes. The concentrate was metered to the flash mixing tank to provide 20 p.p.m. alum, 100 p.p.m. filter aid, and 1 p.p.m. polyelectrolyte and agitated at 70 r.p.m. with a 2 minute detention time. The volume was transferred to the preconditioning tank, agitated at 20 r.p.m. with 6 minutes detention, and pumped to a filter which has been previously precoated.

A standard increment of treated water yielded a head loss increase of 16 inches of water. This is approximately one-half the increase obtained without the concentration step. The effluent yielded a color level of 10 color units.

It is believed the above provides a complete description of the invention in such manner as to distinguish it from other inventions and from what is old, and provides a description of the best mode contemplated of carrying out the invention and thereby complies with the patent statutes.

It is to be understood that variations and modifications of the invention, as illustrated by specific examples herein, may be made without departing from the spirit of the invention. It is also to be understood that the scope of the invention is not to be interpreted as limited to the specific embodiments disclosed herein but only in accordance with the appended claims, when read in the light of the foregoing description.

What I claim is:

1. A method of removing impurities, such as turbidity and color, from water by preconditioning the water comprising, preparing a concentrated slurry of 0.001 to 3200 p.p.m. branch chain organic cationic polyelectrolyte, 45–125,000 p.p.m. floc former selected from the group consisting of salts of trivalent metals, salts of tetravalent metals, and mixtures thereof, and 500 to 125,000 p.p.m. filter aid under conditions to effect a coating of essentially all the floc former upon the filter aid, diluting the concentrated slurry into the water to be treated to provide 10 to 2000 p.p.m. of the treating material, detaining said diluted slurry under agitation to insure complete distribution of the ingredients and incorporation of the impurities of said water with said coating on said filter aid, and passing said coated filter aid-containing water through a filter aid filter medium.

2. A method as defined in claim 1 wherein the concentrated slurry is prepared by passing water into a retention area and adding the polyelectrolyte first to said water under high agitation to insure uniform distribution thereof throughout said water and thereafter adding the floc former and filter aid, and reducing the agitation after the addition of the filter aid to a point to permit precipitation of the floc former as a coating on the filter aid.

3. A method as defined in claim 1 wherein the floc former is aluminum sulfate.

4. A method as defined in claim 1 wherein the floc former is ferric sulfate.

5. A method as defined in claim 1 wherein the concentrated slurry is first diluted in water to provide between 1000 and 25,000 parts of the treating material and subsequently further diluted in the water to be treated.

6. A method of removing impurities from water as defined in claim 1 wherein the ingredients are diluted in the water in amounts between 0.001 and 10 p.p.m. branch chain cationic polyelectrolyte, between 10 and 400 p.p.m. of a floc former, and between 10 and 400 p.p.m. filter aid under condition of agitation to effect a suspension of the particles and incorporation of substantially all the impurities with the coating on the filter aid.

7. A method as defined in claim 6 wherein the polyelectrolyte is diluted to an amount between 0.1 and 3 p.p.m., the floc former between 20 and 200 p.p.m., and the filter aid between 20 and 200 p.p.m.

8. A method as defined in claim 6 wherein the filter aid is selected from the group consisting of diatomaceous silica, perlite, and mixtures thereof.

9. A method as defined in claim 1 wherein the polyelectrolyte is selected from the group consisting of primary, secondary, and tertiary amines, quaternary ammonium, sulfonium salts, and mixtures thereof.

10. A method as defined in claim 9 wherein the polyelectrolyte is a hydrophilic alkylene polyamine polyfunctional halohydrin polymer.

11. A method as defined in claim 9 wherein the polyelectrolyte is a sulfonium active group-containing resin.

References Cited by the Examiner

UNITED STATES PATENTS

| | | |
|---|---|---|
| 2,236,930 | 4/1941 | Uytenbogaart. |
| 2,468,189 | 4/1949 | Frankenhoff _____ 210—75 |
| 2,764,512 | 9/1956 | Wilson _____ 210—24 X |
| 2,941,942 | 6/1960 | Dahlstrom et al. _____ 210—53 |
| 2,995,512 | 8/1961 | Weidner et al. _____ 210—54 |
| 3,142,638 | 7/1964 | Blaisdell et al. _____ 210—54 X |

FOREIGN PATENTS

| | | |
|---|---|---|
| 607,440 | 10/1960 | Canada. |
| 826,770 | 1/1960 | Great Britain. |

OTHER REFERENCES

Conley et al.: Innovations in Water Clarification, Jour. AWWA, October 1960, vol. 52, pp. 1319–1325.

Whistler et al.: Polysaccharide Chemistry, 1953, Academic Press Inc., New York, pp. 161–201.

MORRIS O. WOLK, *Primary Examiner.*